US005875235A

United States Patent [19]
Mohajeri

[11] Patent Number: 5,875,235
[45] Date of Patent: Feb. 23, 1999

[54] TRANSFORMERLESS DATA ACCESS ARRANGEMENT

[75] Inventor: Hessam Mohajeri, San Jose, Calif.

[73] Assignee: S3, Incorporated, Santa Clara, Calif.

[21] Appl. No.: 813,343

[22] Filed: Mar. 7, 1997

[51] Int. Cl.⁶ .................................................. H04M 11/00
[52] U.S. Cl. ..................................... 379/93.36; 379/93.05
[58] Field of Search ............................. 379/93.05, 93.06, 379/93.28, 93.35–93.37, 142, 387, 398, 399, 402, 405, 413, 419

[56] References Cited

U.S. PATENT DOCUMENTS

| 4,395,590 | 7/1983 | Pierce et al. . | |
|---|---|---|---|
| 5,117,452 | 5/1992 | Callele et al. | 379/93.05 |
| 5,369,687 | 11/1994 | Farkas | 379/93.05 |

FOREIGN PATENT DOCUMENTS

| 05 73 721 | 12/1993 | European Pat. Off. . |
| 0 661 862 | 7/1995 | European Pat. Off. . |

OTHER PUBLICATIONS

Krypton, "Krypton K²930G/K²930GW Chipset—Low Cost All Silicon DAA (Data Access Arrangement)", Jan. 15, 1996.

Schweber, Bill, "Testing the Telephony Interface", Mar. 28, 1996, *EDN*.

Mitel, "Line Interface Circuit Preliminary Information", Apr. 1995, Issue 5, MH88422.

Mitel, "Calling Number Identification Circuit 2 Preliminary Information", Feb. 1995, Issue 1, CMOS MT8843.

*Primary Examiner*—Wing F. Chan
*Attorney, Agent, or Firm*—Fenwick & West LLP

[57] ABSTRACT

A transformerless data access arrangement (DAA) device facilitates data transfer between a high speed modem device and a central office telephone line (i.e., a phone line). The DAA device uses D/A and A/D converters in conjunction with a pair of nonlinear opto-couplers that function as an isolation barrier. The A/D converter converts an analog signal received from the phone line into a one-bit modulated digital signal. The digital signal is relayed by the nonlinear opto-couplers to a processor. Since the relayed signal is digital, the use of nonlinear opto-couplers does not result in unacceptable levels of noise and distortion. This is relevant since high speed modems have stringent noise and distortion requirements. A phone line supply voltage is regulated internally and used to power the DAA device. When the processor detects a ring signal on the phone line, the processor generates a control signal which places the A/D and D/A converters in idle mode while sending a caller ID directly to the processor. The processor also initiates a control signal to place the DAA device in and out of its normal operation mode if an off-hook condition is detected.

16 Claims, 4 Drawing Sheets

TRANSFORMERLESS DATA ACCESS ARRANGEMENT

BACKGROUND OF THE INVENTION

1. Field of the Invention

This invention relates generally to data access arrangement devices, which facilitate data transfer between high speed analog modem devices and a telephone central office line, and more particularly to data access arrangement devices employing solid state isolation techniques without the use of transformers or linear opto-couplers.

2. Description of the Related Art

Data Access Arrangement (DAA) devices connect a central office telephone line with end-user equipment. The end-user equipment is typically a high speed analog modem device (e.g., V.32bis or V.34 modem), but DAA devices may also be used with facsimile machines, answering machines, key telephones, two-wire transceivers for short haul modems, and other types of user-defined equipment. The DAA device typically provides line monitoring, filtering, isolation, protection, and/or signal conversion. Conventional DAA devices use transformers to provide some of these functions, particularly isolation. Also, the prior art has used solid state DAA's that use signal modulation to pass through isolations.

The advent of high speed modems and the Personal Computer Memory Card International Association (PCMCIA) card standard, however, has resulted in more stringent demands on systems employing DAA devices, and hence, on DAA devices themselves. For example, high speed modems require that DAA devices function at higher bit rates while simultaneously meeting stringent noise and distortion requirements. The PCMCIA card standard introduces size and weight requirements.

Conventional transformer-based DAA devices have difficulty meeting the PCMCIA size and weight requirements and also have difficulty meeting the performance requirements at higher speeds. As a result, solid-state, transformerless DAA devices have been attempted. For example, opto-couplers have replaced transformers in some DAA device designs. These designs, however, are typically limited to low speed modems due to an inability to meet the stringent noise and distortion requirements at higher speeds; or else they require linear opto-couplers, which can be prohibitively expensive. In another approach, capacitors have replaced transformers as the isolation device. Capacitor designs, however, typically require redundant circuitry in the signal path, resulting in an overall reduction of the system signal-to-noise ratio.

Accordingly, there is a need for a transformerless DAA device which operates at high speeds while meeting stringent noise and distortion requirements but which is not prohibitively expensive.

SUMMARY OF THE INVENTION

In accordance with the invention, a transformerless DAA device that can accommodate high bit rates yet still meet stringent noise and distortion requirements preferably includes a hybrid circuit, an analog-to-digital (A/D) converter, a transmit and a receive opto-coupler, and a digital-to-analog (D/A) converter. The opto-couplers are preferably nonlinear.

For incoming calls received by a modem, the DAA device is coupled to receive an analog signal from a two-wire central office telephone line (i.e., a standard telephone line). The hybrid circuit is coupled to the telephone line and output signals to the A/D converter. The A/D converter converts the analog signal to a one-bit modulated digital signal. The transmit opto-coupler relays the modulated digital signal to a digital signal processor (DSP) while also providing an electrical isolation barrier between the DSP and the telephone line.

For outgoing calls, the DSP shapes and up-samples digital signal before sending it to the receive opto-coupler. The receive opto-coupler relays the digital signal to a D/A converter which reconstructs an analog signal. The reconstructed analog signal is then fed to the central office telephone line via the hybrid circuit.

In further accordance with the invention, a method of facilitating data transfer between a high speed modem device and the central office line without the use of transformers or linear opto-couplers comprises the following steps. An analog signal received from the central office line is converted to a one-bit modulated digital signal. A processed digital signal received from a DSP is converted to an analog signal to be fed to the central office line. In addition, an isolation barrier between the modem device and the central office line is provided using nonlinear opto-couplers.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
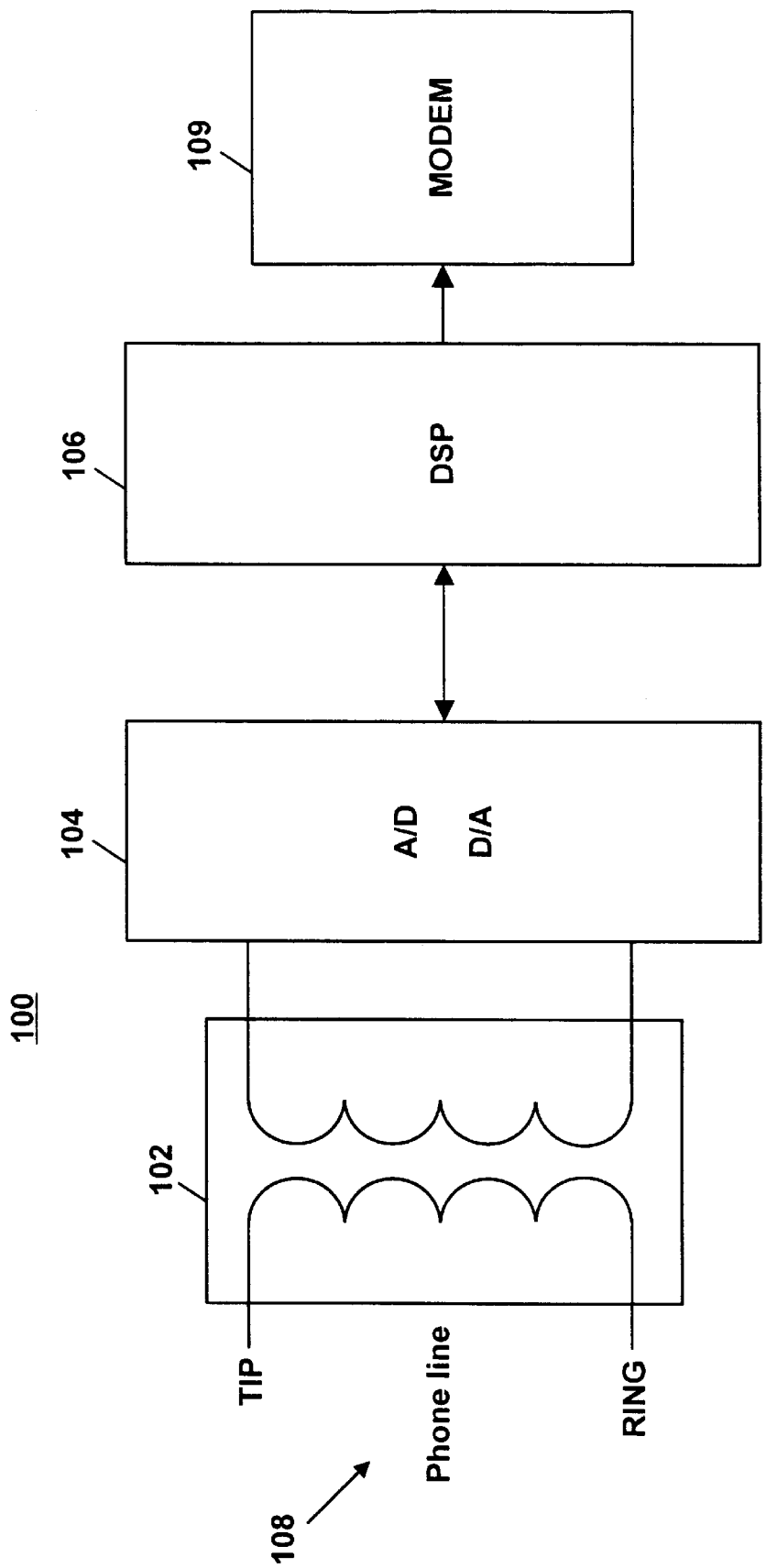
FIG. 1 is a block diagram of a conventional interface between a modem device and a central office line using a transformer as an isolation barrier.

FIG. 1 is a block diagram illustrating a prior art interface 100 coupling a central office telephone line 108 to a modem 109. The interface 100 includes a transformer 102, a combined analog-to-digital (A/D) converter and digital-to-analog (D/A) converter 104, and a digital signal processor (DSP) 106.

The central office telephone line 108 is a two-wire transmission line and includes Tip and Ring wires provided by the central office. The central office is not shown in FIG. 1. The Tip and Ring wires 108 are coupled to one port of the transformer 102; the other port of the transformer 102 being coupled to the converter 104. The converter 104 is also coupled to the DSP 106, which in turn is coupled to the modem 109. For convenience and ease of understanding, the modem 109 and DSP 106 are shown as two blocks, however, those skilled in the art will recognize that the two blocks may also include D/A and A/D converters to convert signals sent and received by the DSP 106 through the modem 109 which outputs analog signal on the telephone line. Those skilled in the art will also realize that the modem 109, DSP 106 and any D/A and A/D converters can be integrated into single or multiple devices.

When the telephone line 108 is transmitting signals to the modem 109, the transformer 102 receives an analog signal from line 108. The transformer 102 relays the analog signal to the converter 104 while simultaneously isolating the converter 104 from the telephone line 108. The converter 104 digitizes the received analog signal. The digital signal is then processed by the DSP 106 and then received by the modem 109.

When the telephone line 108 is receiving signals from the modem 109, the DSP 106 receives signals from the modem 109 and then provides processed digital signals to the converter 104. The converter 104 reconstructs an analog signal from the digital signal. The transmission line 108 receives the analog signal via the transformer 102.

The transformer 102 electrically isolates the transmission line 108 from the modem 109 and the DSP 106. The transformer 102 electrically isolates both the DSP 106 and the modem 109 from line 108. Thus, the ground between the entire transmitter and receiver for the system 200 is separated. However, the non-linearity of the transformer 102 can cause problems in systems that demand low noise, low distortion data transfer at high bit rates. Furthermore, linearity is one of the most important concerns in the design of modems. In addition, the size of the transformer 102 can prohibit its use in systems which demand small volume and/or light weight. Accordingly, it is desirable to replace the transformer 102 with a solid-state device.

Figure 2:
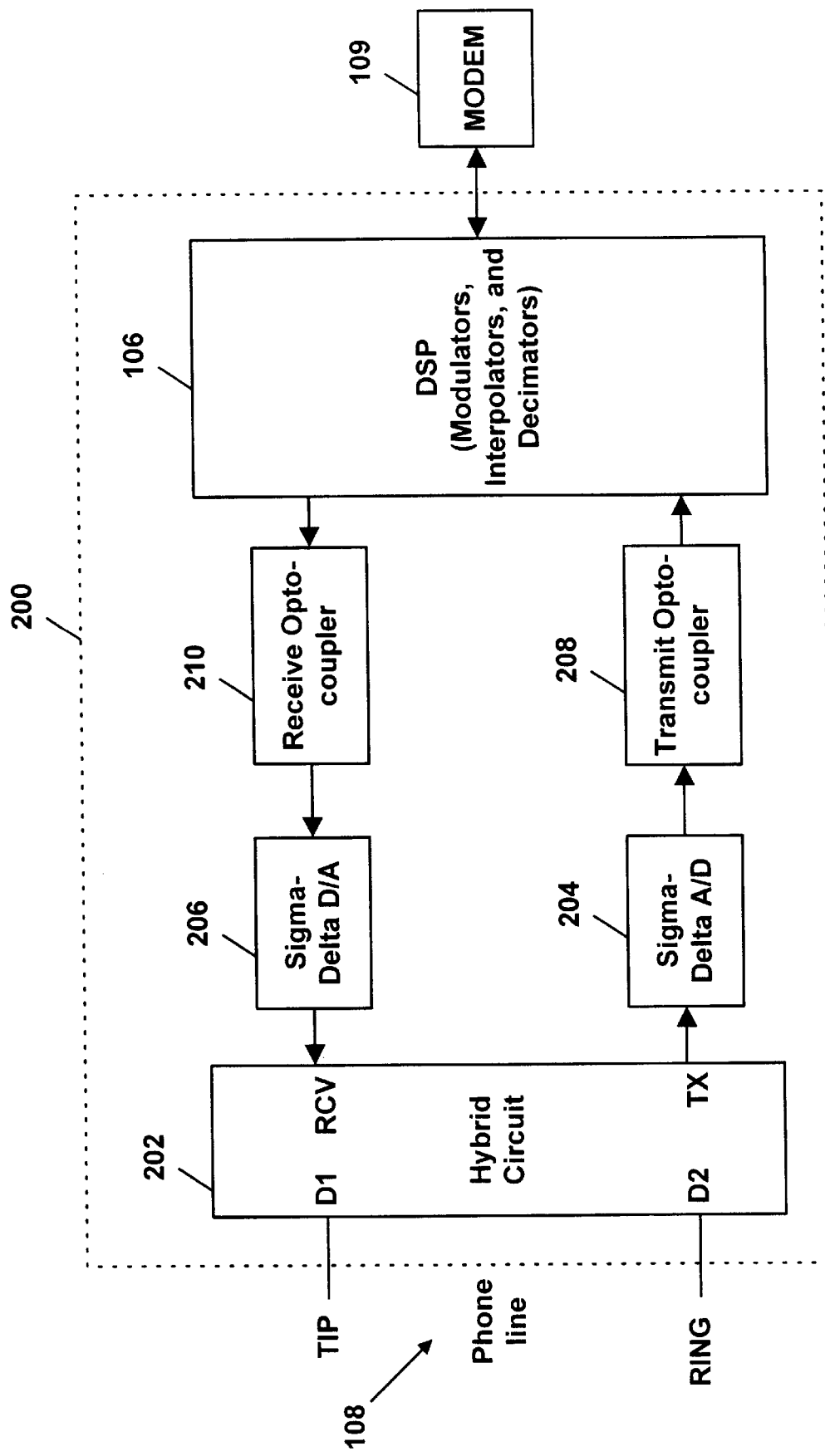
FIG. 2 is a block diagram illustrating a transformerless DAA device in accordance with the invention.

FIG. 2 is a block diagram illustrating a transformerless DAA device 200 coupling a telephone line 108 to a modem 109, in accordance with the invention. The primary functions of the DAA device 200 are performed by a hybrid circuit 202, a sigma-delta A/D converter 204, a sigma-delta D/A converter 206, a transmit opto-coupler 208, a receive opto-coupler 210, and a DSP 106.

The elements of the DAA device 200 are coupled together to form two signal paths through the DAA device 200, one for receiving signals from the modem 109 and one for transmitting signals to the modem 109. The hybrid circuit 202 is coupled to the Tip and Ring wires of the telephone line 108 and may both receive and transmit to the line 108. For the transmit path to the modem 109, an output TX of the hybrid circuit 202 is coupled to an input of the sigma-delta A/D converter 204; an output of the converter 204 is coupled to an input of the transmit opto-coupler 208; and an output of the transmit opto-coupler 208 is coupled to the DSP 106. The DSP 106 is then coupled to the modem 109. For the receive path, an output of the modem-coupled DSP 106 is coupled to an input of the receive opto-coupler 210; an output of the receive opto-coupler 210 is coupled to an input of the sigma-delta D/A converter 206; and an output of the converter 206 is coupled to an input RCV of the hybrid circuit 202.

The hybrid circuit 202 is a two-wire to four-wire converter which can be constructed using techniques well-known in the art. Components for the hybrid circuit 202 are preferably selected to minimize trans-hybrid loss. The hybrid circuit 202 has three ports consisting of one wire-pair each. In FIG. 2, TX and RCV each represent one port; while D1 and D2 together represent the third port, which will be referred to as the D port. Note that TX and RCV, while depicted by a single arrow in FIG. 2, actually represent two wires each; while D1 and D2 represent one wire each. The hybrid circuit 202 converts the D wire-pair, which may be used both for transmitting and receiving signals, to the two wire-pairs TX and RCV, where TX transmits while RCV receives. The hybrid circuit 202 also performs echo cancellation. In a preferred embodiment, the hybrid circuit 202 is connected to the transmission line 108 via intermediate circuitry which is not shown in FIG. 2 but will be discussed later.

When the telephone line 108 is transmitting signals to the modem 109, the hybrid circuit 202 receives the incoming signal from line 108 at the D port and provides a balanced analog signal at the TX output. The sigma-delta A/D converter 204 converts the analog signal into a one-bit modulated digital signal. The transmit opto-coupler 208 relays the digital signal to the DSP 106 while simultaneously electrically isolating the DSP 106 from the converter 204 or, more generally, isolating the modem 109 from the telephone line 108. The DSP 106 processes the digital signal using conventional functions, such as modulation, interpolation, and decimation, and then sends the processed signal to the modem 109.

When the telephone line 108 is receiving signals from the modem 109, the modem 109 transmits a digital signal to the DSP 106. The present invention is particularly advantageous because it digitizes the analog line data and transmits one bit stream across the isolation. The modem 109 is used as a controller to pack the bits and create a frame for transmission. After noise shaping and up sampling the signal, the DSP 106 sends the processed digital signal to the receive opto-coupler 210, which relays the signal to the sigma-delta D/A converter 206. The converter 206 reconstructs an analog signal from the relayed digital signals. The hybrid circuit 202 then receives this analog signal at its RCV port and transmits the analog signal to the two-wire transmission line 108 via its D port.

The opto-couplers 208 and 210 electrically isolate the transmission line 108 from the modem 109, similar to the transformer 102 in FIG. 1. In a preferred embodiment, the opto-couplers 208 and 210 may be nonlinear opto-couplers rather than linear opto-couplers. Since the opto-couplers 208 and 210 are relaying digital data, nonlinear opto-couplers may be used without exceeding acceptable noise and distortion levels at high bit rates. Therefore, the present invention is particularly advantageous in two respects. First, the DAA device 200 transmits digital data across the isolation barrier rather than analog data. Second, the DAA device 200 uses sigma-delta modulation for simplicity of design. Those skilled in the art will realize that a variety of other types of A/D and D/A converters could be used, for example, in situations where a higher speed link is need to transmit data to other chips. Nonlinear opto-couplers offer an advantage of lower cost. Thus, the opto-couplers 208 and 210, when used in accordance with the invention, provide better performance (e.g., less noise) for lower cost than the conventional transformer 102 in FIG. 1.

While this embodiment of the invention uses sigma-delta A/D and D/A converters, those skilled in the art will realize that other types of A/D and D/A converters may also be used. The sigma-delta design, however, provides superior performance in applications that require high dynamic range, accuracy, and superior noise properties. Furthermore, the sigma-delta design exploits developed technology that permits effective integration of analog and digital functions on the same VLSI chip.

Figure 3:
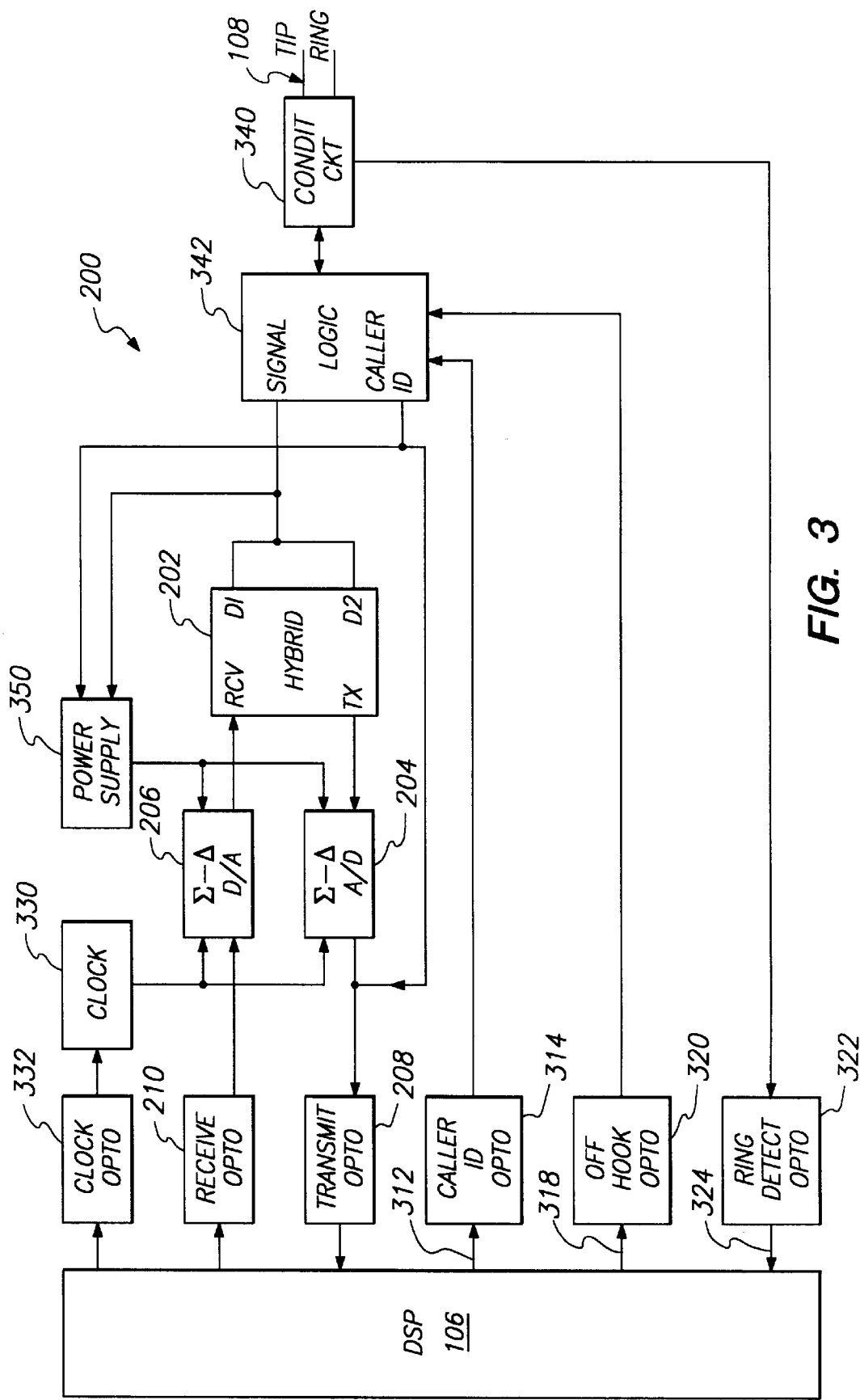
FIG. 3 is a more detailed block diagram of the transformerless DAA device of FIG. 2.

FIG. 3 is a more detailed block diagram illustrating the transformerless DAA device 200 of FIG. 2. The DAA device 200 of FIG. 3 includes the following elements in addition to the ones shown in FIG. 2. A conditioning circuit 340 and a logic circuit 342 provide additional functionality for the receive and transmit paths to the modem 109. A caller ID opto-coupler 314, an off-hook opto-coupler 320, and a ring detect opto-coupler 322 provide isolation for some of the additional functionality supplied by the conditioning circuit 340 and the logic circuit 342. A clock generator 330, a clock opto-coupler 332, and a power supply 350 provide auxiliary functions to the sigma-delta converters 204 and 206.

The elements previously shown in FIG. 2 are coupled together in the same manner in FIG. 3, with the following exception. In FIG. 2, the hybrid circuit 202 was coupled to the Tip and Ring wires 108 but no intermediate circuitry was shown. FIG. 3 explicitly shows both the logic circuit 342 and the conditioning circuit 340. The Tip and Ring wires 108 are coupled to the conditioning circuit 340 which in turn is coupled to the logic circuit 342. A signal port of the logic circuit 342 is coupled to the D wire-pair of the hybrid circuit 202. A caller ID port of the logic circuit 342 is coupled directly to the transmit opto-coupler 208, bypassing both the hybrid circuit 202 and the sigma-delta A/D converter 204.

The three opto-couplers 314, 320 and 322 relay signals between the DSP 106 and either the logic circuit 342 or the conditioning circuit 340. The caller ID opto-coupler 314 is coupled to receive a caller ID control signal 312 from DSP 106 and relay that signal to an input of logic circuit 342. Similarly, off-hook opto-coupler 320 is coupled to receive an off-hook control signal 318 from DSP 106 and relay that signal to a second input of logic circuit 342. The ring detect opto-coupler 322 is coupled to receive a signal from conditioning circuit 340 and to transmit a ring detect flag signal 324 to the DSP 106.

The clock generator 330 and clock opto-coupler 332 supply a clock signal to the sigma-delta converters 204 and 206. More specifically, the clock opto-coupler 332 is coupled to the DSP 106 and receives a signal from which a clock may be generated from the DSP 106. The clock opto-coupler 332 relays this signal to the clock generator 330, which then generates a clock signal. The clock generator 330 is coupled to the converters 204 and 206 in order to distribute the clock signal to the converters.

The power supply 350 uses the supply voltage of the transmission line 108 to power the sigma-delta converters 204 and 206. More specifically, the power supply 350 is coupled to receive its input power from the signal port and/or the caller ID port of logic circuit 342, depending on the mode in which the DAA device 200 is operating. The power supply 350 regulates the input power, producing output power suitable for the converters 204 and 206. The power supply 350 is coupled to the converters 204 and 206 in order to deliver its regulated power output to the converters.

When the modem 109 is receiving or transmitting signals, the signals follow the same paths as those described for FIG. 2 with the following clarifications. When signals are transmitted from the line 108 to the modem 109, the signal on the Tip and Ring wires 108 is first rectified by the conditioning circuit 340. The rectified signal is then input to the logic circuit 342. The logic circuit 342 operates as a sort of multiplexer, coupling the conditioning circuit 340 to either the signal port and/or the caller ID port of the logic circuit 342 based on signals received from the caller ID opto-coupler 314 and the off-hook opto-coupler 320. When signals are transmitted from the line 108 to the modem 109, the logic circuit 342 couples the rectified signal from the conditioning circuit 340 to the signal port of the logic circuit 342. The signal is then transmitted from the signal port to the hybrid circuit 202 and the remainder of the signal path is as described for FIG. 2.

When the line 108 receives signals from the modem 109, similar clarifications apply. Specifically, the hybrid circuit 202 transmits signals to the Tip and Ring wires 108 through the signal port of the logic circuit 342 and then the conditioning circuit 340.

In addition to receiving and transmitting signals between the telephone line 108 and modem 109, the DAA device 200 also performs functions related to setting up the telephone connection between the line 108 and modem 109.

When the central office (not shown) initiates the telephone connection, the office first places an alternating current on the transmission line 108. In response to this alternating current, the ring detect opto-coupler 322 generates a ring detect flag signal 324 which interrupts the DSP 106.

A caller ID control signal 312 is then generated by the DSP 106 and relayed by the caller ID opto-coupler 314 to the logic circuit 342. In response, the logic circuit 342 couples the conditioning circuit 340 to the caller ID port of the logic circuit 342. The central office transmits the caller ID on line 108 as a frequency shift keyed (FSK) modulated signal during the first and second rings. Since there is no amplitude information in the FSK modulated caller ID, it can be passed directly to the transmit opto-coupler 208 for relaying to the DSP 106.

Power for the A/D and D/A converters 204 and 206 is supplied by the power supply 350. During the caller ID operation, the power supply 350 taps power from the telephone line 108 via the caller ID port of the logic circuit 342. Power consumption of the DAA device 200 should be kept low in order to prevent ringing from stopping. In a preferred embodiment, this is accomplished by powering down the A/D and D/A converters 204 and 206 or placing them into an idle mode since the converters are not used during the caller ID period.

After the caller ID is removed from the transmission line 108, the DSP 106 generates an off-hook control signal 318 which is relayed by the off-hook opto-coupler 320 to the logic circuit 342. In response, the logic circuit 342 couples the conditioning circuit 340 to the signal port of the logic circuit 342, thus allowing the transmission and receipt of signals from the line 108 to the modem 109.

When the modem 109 initiates the telephone connection, the DSP 106 simply generates the off-hook control signal 318, thus coupling the conditioning circuit 340 to the signal port of the logic circuit 342. The modem 109 then begins transmission.

The opto-couplers 208, 210, 314, 320, 322, and 332 electrically isolate the DSP 106 from the remainder of the DAA device 200. More generally, the opto-couplers isolate the modem 109 from the telephone line 108.

Figure 4:
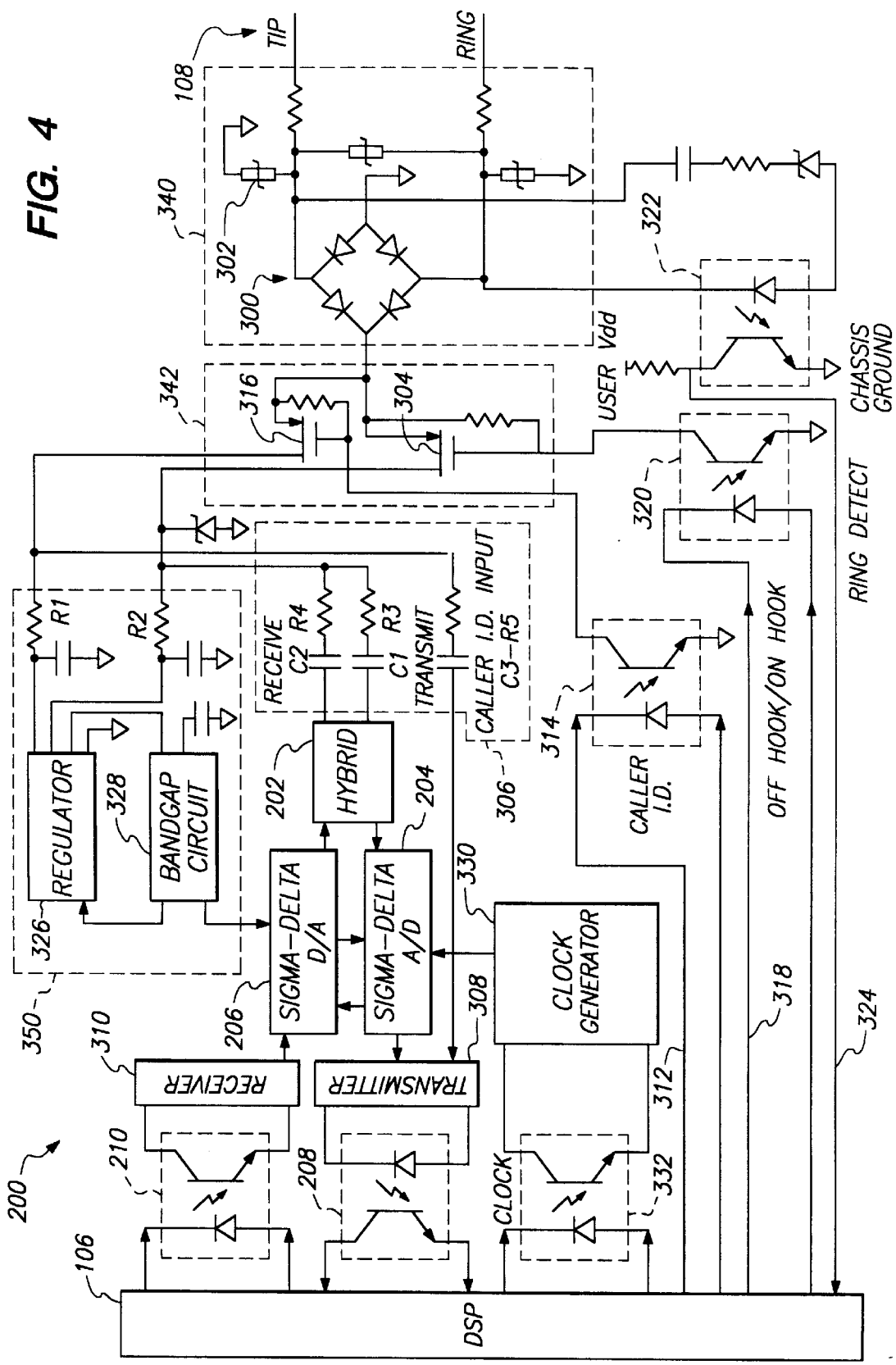
FIG. 4 is a circuit schematic of the transformerless DAA device of FIG. 3.

FIG. 4 is a circuit schematic of a preferred embodiment of the transformerless DAA device 200 of FIG. 3. The schematic additionally depicts a balancing network 306, a transmit driver 308 and a receive driver 310. The schematic also shows further details of some of the elements in FIG. 3.

The transmit and receive drivers 308 and 310 couple the sigma-delta converters 204 and 206 to the transmit and receive opto-couplers 208 and 210, respectively. The drivers 308 and 310 optimize the impedance match between the respective converters 204 and 206 and opto-couplers 208 and 210, using techniques well-known in the art. The transmit driver 308 is also coupled to receive the caller ID from the caller ID port of the logic circuit 342 via the balancing network 306.

The balancing network 306 includes three resistor-capacitor pairs: C2–R4, C1–R3, and C3–R5. C2–R4 and C1–R3 couples the signal port of the logic circuit 342 to D1 and D2 of the hybrid circuit 202, respectively. These two resistor-capacitor pairs electrically balance the hybrid circuit 202 with the two-wire transmission line 108 over a frequency range determined by the values of C1, C2, R3, and R4. Similarly, the pair C3–R5 couples the caller ID port of the logic circuit 342 to the transmit driver 308, and electrically balances the two-wire transmission line 108 over a frequency range determined by C3 and R5.

The conditioning circuit 340 includes a diode bridge 300 and varistors 302. The diode bridge 300 couples Tip and Ring wires 108 to the logic circuit 342. The bridge 300 communicates a balanced full duplex analog signal with the central office two-wire transmission line 108. The diode bridge 300 half wave rectifies a single ended ring signal from the central office and full wave rectification is achieved if the ring signal is balanced. The metal oxide varistors 302 provide network protection.

The logic circuit 342 includes a first switch 304 and a second switch 316. The first switch 304 switchably couples the diode bridge 300 to the signal port of the logic circuit 342 and is switched by the off hook control signal 318 as relayed by the off hook opto-coupler 320. The second switch 316 switchably couples the diode bridge 300 to the caller ID port and is switched by the caller ID control signal 312 as relayed by the caller ID opto-coupler 314. In a preferred embodiment, both switches 304 and 316 are field effect transistors biased to function as switches.

The power supply 350 includes a voltage regulator 326 and a band gap circuit 328. The DAA device 200 uses the transmission line 108 supply voltage to power its internal circuitry. Therefore, the power supply 350 taps its power from either the signal port or the caller ID port of the logic circuit 342, depending on the mode in which the DAA device 200 is operating. The caller ID and signal ports are coupled to the regulator 326 via limit resistors R1 and R2, respectively. The regulator 326 is coupled to the band gap circuit 328, forming a regulator circuit which supplies regulated power to the sigma-delta converters 204 and 206. In addition, when transistor 304 is ON or shorted, then current is drawn from the line 108 and this signal the central office that the DAA device 200 is off-hook.

Although the invention has been described in considerable detail with reference to certain preferred embodiments thereof, other embodiments are possible. For example, the invention can be incorporated into an integrated circuit on a semiconductor device using techniques know in the art. Therefore, the spirit and scope of the appended claims should not be limited to the description of the preferred embodiments contained herein.

What is claimed is:

1. A transformerless data access arrangement device for facilitating data transfer between a high speed modem device and a central office telephone line while maintaining electrical isolation therebetween, the data access arrangement device comprising:

a logic circuit having a telephone port, a signal port, a caller ID output, and a caller ID control input, for transmitting a first analog signal from the central office telephone line to the caller ID output when a caller ID control signal received at the caller ID control input is asserted, and for transmitting the first analog signal to the signal port when the caller ID control signal is not asserted;

an analog-to-digital converter having an input and an output for converting the first analog signal into a first digital signal, the input of the analog-to-digital converter coupled to the signal port of the logic circuit for receiving the first analog signal;

a transmit opto-coupler having an input and an output for electrically isolating the input of the transmit opto-coupler from the output of the transmit opto-coupler, the input of the transmit opto-coupler coupled to the output of the analog-to-digital converter for receiving the first digital signal, the input of the transmit opto-coupler further coupled to the caller ID output of the logic unit for receiving the first analog signal, the output of the transmit opto-coupler providing a second signal;

a receive opto-coupler having an input and an output for electrically isolating the input of the receive opto-coupler from the output of the receive opto-coupler, the input of the receive opto-coupler coupled to receive a third digital signal from the high speed modem device, the output of the receive opto-coupler for providing a fourth digital signal in response to the third digital signal;

a digital-to-analog converter having an input and an output for converting the fourth digital signal into a second analog signal, the input of the digital-to-analog converter coupled to the output of the receive opto-coupler for receiving the fourth digital signal, the output of the digital-to-analog converter providing the second analog signal;

a hybrid circuit having a plurality of inputs and outputs for converting the first and the second analog signal from a two-wire to a four-wire signal path, at least one input of the hybrid circuit coupled to receive the first analog signal from the signal port of the logic circuit, and at least one of the outputs of the hybrid circuit coupled to the input of the analog-to-digital converter, and at least one of the outputs of the hybrid circuit coupled to the input of the digital-to-analog converter.

a power supply having an input and an output for generating a regulated voltage supply from a supply voltage of the central office telephone line, the input of the power supply coupled to the signal port of the logic circuit and to the called ID output of the logic circuit, the output of the power supply coupled to the analog-to-digital converter and to the digital-to-analog converter for providing the regulated voltage supply to the analog-to-digital converter and to the digital-to-analog converter; wherein the analog-to-digital converter and the digital-to-analog converter switch into an idle mode to conserve power when the caller ID control signal is asserted.

2. A transformerless data access arrangement device for facilitating data transfer between a high speed modem device and a central office telephone line while maintaining electrical isolation therebetween, the data access arrangement device comprising;

a logic circuit having a telephone port, a signal port, a caller ID output, and a caller ID control input, for transmitting a first analog signal from the central office telephone line to the caller ID output when a caller ID control signal received at the caller ID control input is asserted, and for transmitting the first analog signal to the signal port when the caller ID control signal is not asserted;

an analog-to-digital converter having an input and an output for converting the first analog signal into a first digital signal, the input of the analog-to-digital converter coupled to the signal port of the logic circuit for receiving the first analog signal; and a transmit opto-coupler having an input and an output for electrically isolating the input of the transmit opto-coupler from the output of the transmit opto-coupler, the input of the transmit opto-coupler coupled to the output of the analog-to-digital converter for receiving the first digital signal, the input of the transmit opto-coupler further coupled to the caller ID output of the logic unit for receiving the first analog signal, the output of the transmit opto-coupler providing a second signal to the high speed modem device.

3. The device of claim 1, further comprising;

a power supply having an input and an output for generating a regulated voltage supply from a supply voltage of the central office telephone line, the input of the power supply coupled to the signal port of the logic circuit and to the caller ID output of the logic circuit, the output of the power supply coupled to the analog-to-digital converter for providing the regulated voltage supply to the analog-to-digital converter.

4. The device of claim 3, wherein the analog-to-digital converter switches into an idle mode to conserve power when the caller ID control signal is asserted.

5. The device of claim 1, wherein the analog-to-digital converter uses sigma-delta modulation.

6. The device of claim 1, wherein the transmit opto-coupler includes a nonlinear opto-coupler.

7. The device of claim 1, further comprising:

a receive opto-coupler having an input and an output for electrically isolating the input of the receive opto-coupler from the output of the receive opto-coupler, the input of the receive opto-coupler coupled to receive a third digital signal, the output of the receive opto-coupler for providing a fourth digital signal in response to the third digital signal; and a digital-to-analog converter having an input and an output for converting the fourth digital signal into a second analog signal, the input of the digital-to-analog converter coupled to the output of the receive opto-coupler to receive the fourth digital signal, the output of the digital-to-analog converter providing the second analog signal; and a hybrid circuit having a plurality of inputs and outputs for converting the first and the second analog signal from a two-wire to a four-wire signal path, at least one input of the hybrid circuit coupled to receive the first analog signal from the signal port of the logic circuit, and at least one of the outputs of the hybrid circuit coupled to the input of the analog-to-digital converter, and at least one of the outputs of the hybrid circuit coupled to the input of the digital-to-analog converter.

8. The device of claim 1, further comprising a clock generator for providing a clock to the digital-to-analog converter.

9. The device of claim 1, further comprising:

a ring detect opto-coupler having an input and an output for detecting an alternating current on the central office telephone line, the input of the ring detect opto-coupler coupled to the central office telephone line and the output of the ring detect opto-coupler for coupling to a processor.

10. The device of claim 1, further comprising an off-hook opto-coupler having a plurality of inputs and an output responsive to an off-hook signal from a processor, the inputs of the off-hook opto-coupler coupled to receive an off-hook signal from the processor, the output of the off-hook opto-coupler for switching the data access arrangement device in and out of its normal operating mode.

11. The device of claim 1, further comprising a caller ID opto-coupler having a plurality of inputs and an output responsive to a caller ID control signal, the input of the caller ID opto-coupler coupled to receive the caller ID control signal from a processor, the output of the caller ID opto-coupler coupled to the caller ID control input of the logic circuit.

12. A method of facilitating data transfer between a high speed modem device and a central office telephone line while maintaining electrical isolation therebetween without using a transformer, comprising the steps of:

receiving a first analog signal from a central office telephone line, wherein the first analog signal includes a caller ID portion;

converting the first analog signal, exclusive of the caller ID portion, into a first digital signal;

providing an isolation barrier between the central office telephone line and the high speed modem device and electro-optically transmitting the first digital signal and the caller ID portion across the isolation barrier.

13. The method of claim 12, further comprising the steps of:

generating a regulated voltage supply from a supply voltage of the central office telephone line; and powering the step of converting the first analog signal into a first digital signal with the regulated voltage supply.

14. The method of claim 12, further comprising the steps of:

detecting an alternating current on the central office telephone line; and generating a processor interrupt in response to the detection of the alternating current.

15. The method of claim 12, further comprising the steps of:

receiving an off-hook signal; and switching from a normal operating mode in response to reception of the off-hook signal.

16. The method of claim 12, further comprising the steps of:

receiving a caller ID control signal; and responsive to reception of the caller ID control signal, reducing the power consumed by the step of converting the first analog signal into a first digital signal.

* * * * *

UNITED STATES PATENT AND TRADEMARK OFFICE
CERTIFICATE OF CORRECTION

PATENT NO. : 5,875,235

DATED : February 23, 1999

INVENTOR(S) : Hessam Mohajeri

It is certified that error appears in the above-identified patent and that said Letters Patent is hereby corrected as shown below:

In column 9, line 6, delete "claim 1" and insert --claim 2--.

In column 9, line 18, delete "claim 1" and insert --claim 2--.

In column 9, line 20, delete "claim 1" and insert --claim 2--.

In column 9, line 22, delete "claim 1" and insert --claim 2--.

In column 9, line 46, delete "claim 1" and insert --claim 2--.

In column 9, line 49, delete "claim 1" and insert --claim 2--.

In column 10, line 1, delete "claim 1" and insert --claim 2--.

In column 10, line 9, delete "claim 1" and insert --claim 2--.

Signed and Sealed this

Tenth Day of August, 1999

Attest:

Q. TODD DICKINSON

*Attesting Officer*  *Acting Commissioner of Patents and Trademarks*